United States Patent

Hirayama et al.

[11] Patent Number: 5,558,289
[45] Date of Patent: Sep. 24, 1996

[54] SPINNING REEL

[75] Inventors: Hirokazu Hirayama, Takaishi; Seiichi Aratake, Izumi, both of Japan

[73] Assignee: Shimano Inc., Osaka, Japan

[21] Appl. No.: 397,337

[22] Filed: Mar. 2, 1995

[30] Foreign Application Priority Data

Mar. 8, 1994 [JP] Japan .................... 6-037022

[51] Int. Cl.$^6$ .................................. A01K 89/01
[52] U.S. Cl. .................................. 242/231
[58] Field of Search .................... 242/230, 231, 242/232, 233

[56] References Cited

U.S. PATENT DOCUMENTS

| 4,171,108 | 10/1979 | Ishida et al. | 242/231 |
| 5,379,957 | 1/1995 | Furomoto et al. | 242/230 |

FOREIGN PATENT DOCUMENTS

| 4218013 | 12/1992 | Germany | 242/230 |
| 5023080 | 2/1993 | Japan | 242/231 |
| 5137485 | 6/1993 | Japan | 242/231 |
| 6000044 | 1/1994 | Japan | 242/230 |
| 6125683 | 5/1994 | Japan | 242/231 |
| 2254534 | 10/1992 | United Kingdom . | |
| 2260250 | 4/1993 | United Kingdom . | |

*Primary Examiner*—Daniel P. Stodola
*Assistant Examiner*—William A. Rivera
*Attorney, Agent, or Firm*—Shinjyu Office of Patent Attorneys

[57] ABSTRACT

A spinning reel having a reel body (2), a rotor (3) and a spool (4). The rotor (3) is supported on the front of the reel body (2) with freedom to rotate, and has a first arm portion (31) and a second arm portion (32) which are located facing each other such that the rotating spindle is interposed between them, a first bail support member (40) which is fitted to the tip of the first arm portion (31) and which has at its tip a line roller (41) a second bail support member (43) which is fitted to the tip of the second arm portion (32), and a bail (45). The spool (4) is located between the first arm portion (31) and the second arm portion (32). Further, the distance from the rotational axis (X) of the rotor (3) to the center of gravity of the second bail support member (43) is longer than the distance from the rotational axis (X) of the rotor (3) to the center of gravity of the first bail support member (40) including the line roller (41).

12 Claims, 8 Drawing Sheets

1

SPINNING REEL

BACKGROUND OF THE INVENTION

A) FIELD OF THE INVENTION

The present invention relates to a spinning reel for a fishing rod, and in particular to a spinning reel in which a rotor, which has a pair of arm portions located opposite each other, is supported on the spinning reel body with freedom to rotate.

B) DESCRIPTION OF THE RELATED ART

In general, spinning reels include a reel body, a rotor which is supported on the reel body with freedom to rotate and a spindle on which fishing line is wound. The rotor usually has a first arm portion and a second arm portion which are located facing each other such that the rotational spindle is between them, swinging arms which are fixed to the tips of each arm portion with freedom to swing, and a bail which is provided between the two swinging arms. The bail swings together with the two swinging arms and can adopt a line release state and a line winding state. Further, a line guide portion which guides the fishing line is provided at the tip of one of the swinging arms. The line guiding portion generally consists of a rotating member known as a line roller. Further, when the fishing line is being wound, the fishing line is lead to the line guiding portion via the bail and is wound from the line guiding portion onto the spool.
Problems to be overcome by the invention Since, as outlined above, a line roller is provided at the tip of the first arm portion, the overall center of gravity of the members on the first arm portion side is positioned relatively forward. Thus even if a balance is provided on the second arm portion side, it is difficult to unify the overall center of gravity of the members on the first arm portion side and the overall center of gravity of the members including the balance on the second arm portion side in the axial direction. Therefore, in a conventional spinning reel, imbalance during rotation is not eliminated even if a balance is provided on the second arm portion side, and it is difficult to obtain a smooth winding action.

Further, it has been proposed to eliminate imbalance during rotation by increasing the weight of the swinging arm at the tip of the second arm portion to make it function as a balance, but with a conventional spinning reel in which the weight of the swinging arm is increased, the overall weight of the rotor is inevitably increased. Furthermore, Japanese laying-open utility model gazette no. S52-55892 proposes forming each arm separately from the rotor body and making it possible to vary the position of each arm in the radial direction. In this case it is possible to suppress imbalance during rotation by displacing one of the arms. There are problems, however, in that the number of components is increased and the overall weight of the rotor is increased.

SUMMARY OF THE INVENTION

An object of the present invention is to suppress imbalance during rotation without providing balances or increasing the overall weight of the rotor.

Another object of the present invention is to make arrangements such that the overall center of gravity of members in the opposing arm portions can be easily unified in the direction of the rotational axis of the rotor.

Yet another object of the present invention is to make arrangements such that the overall center of gravity of the components in the opposing arm portions can be easily unified in the direction of the rotational axis of the rotor by means of a simple construction without providing special members.

Yet another object of the present invention is to reduce imbalance without increasing the size of the reel.

Yet another object of the present invention is to suppress imbalance resulting from the bail by means of a simple construction.

Yet another object of the present invention is to make it difficult for the line to be caught on the arm portion of the rotor.

The spinning reel according to present invention is provided with a reel body which has a handle and which can be fitted to a fishing rod, a rotor, and a spool. The rotor has a cylindrical portion supported with freedom to rotate about a rotational axis at the front of the reel body, a first arm portion and a second arm portion which are formed integrally with the cylindrical portion and which are located facing each other at the side of the cylindrical portion with the rotational axis between them, a first bail support member which is fitted to the tip of the first arm portion and which has at its tip a line guiding portion, a second bail support member which is fitted to the tip of the second arm portion, and a bail which is provided extending between the first bail support member and the second bail support member, and the rotor is rotated by means of the handle. The spool is located between the first arm portion and the second arm portion. The distance from the rotational axis of the rotor to the center of gravity of the second bail support member is longer than the distance from the rotational axis of the rotor to the center of gravity of the first bail support member including the line guiding portion.

In a spinning reel according to another aspect of the present invention the first bail support member and second bail support member are respectively attached to the outside of the first arm portion and second arm portion, and the distance from the rotational axis of the rotor to the second bail support member attachment seat face of the second arm is longer than the distance from the rotational axis of the rotor to the first bail support member attachment seat face of the first arm.

In a spinning reel according to yet another aspect of the present invention, the first bail support member is attached to the inside of the first arm portion and the second bail support member is attached to the outside of the second arm portion, and the distance from the rotational axis of the rotor to the side face of the second bail support member on the rotational axis side is longer than the distance from the rotational axis of the rotor to the side face of the first bail support member on the rotational axis side.

In a spinning reel according to yet another aspect of the present invention, the second arm portion is inclined such that it becomes further away from the rotational axis of the rotor as one moves towards the tip.

In a spinning reel according to yet another aspect of the present invention, each of the bases of the first and second arm portions are positioned equidistant from the rotational axis of the rotor.

In a spinning reel according to yet another aspect of the present invention, the first bail support member and second bail support member are each fitted with freedom to swing, and the bail swings together with the two bail support members and can adopt a line release state and a line winding state. Further, the first and second arm portions are displaced, with respect to the rotational axis of the rotor, to the side on which the bail is positioned in the line release state.

In a spinning reel according to yet another aspect of the present invention, the first and second arm portions are inclined such that the tips are positioned on the side on which the bail is positioned in the line release state, and the bases are positioned on the side on which the bail is positioned in the line winding state.

In a spinning reel according to yet another aspect of the present invention, there is further provided a balance means which is located on that arm portion side, from among the first and second arm portions, whose center of gravity is positioned further forward, and on the reel body side of the bail support member.

In a spinning reel according to yet another aspect of the present invention, the balance means is fitted to the outside of that arm portion, from among the first and second arm portions, whose center of gravity is positioned further forward, and consists of a cover which is formed from a material whose specific density is greater than the specific density of the material from which the rotor is constructed.

In a spinning reel according to yet another aspect of the invention, the rear end of the second bail support member and the abovementioned second arm portion are connected smoothly.

In the spinning reel according to the present invention, the distance from the rotational axis of the rotor to the center of gravity of the second bail support member is longer than the distance from the rotational axis of the rotor to the center of gravity of the first bail support member including the line grading portion.

Here, since the second bail support member at the tip of the second arm portion is further from the rotational axis, the centrifugal force during rotation is large even if the weight of the second bail support member is small. It is thus possible to suppress imbalance during rotation without increasing the weight of the second bail support member. Further, since the cylindrical portion of the rotor and the 2 arm portions are formed integrally, no increase in the number of components or increase in weight is entailed.

In a spinning reel according to another aspect of the present invention the first bail support member and second bail support member are respectively attached to the outside of the first arm portion and second arm portion, and the distance from the rotational axis of the rotor to the second bail support member attachment seat face of the second arm is longer than the distance from the rotational axis of the rotor to the first bail support member attachment seat face of the first arm. Here, the abovementioned action is more effective.

In a spinning reel according to yet another aspect of the present invention, the first bail support member is attached to the inside of the first arm portion and the second bail support member is attached to the outside of the second arm portion, and the distance from the rotational axis of the rotor to the side face of the second bail support member on the rotational axis side is longer than the distance from the rotational axis of the rotor to the side face of the first bail support member on the rotational axis side. Thus the abovementioned action is more effective.

In a spinning reel according to yet another aspect of the present invention, the second arm portion is inclined such that it becomes further away from the rotational axis of the rotor as one moves towards the tip, and thus the abovementioned action is more effective, and it is moreover possible to keep down the dimension of the rotor on the reel body side.

In a spinning reel according to yet another aspect of the present invention, each of the bases of the first and second arm portions are positioned equidistant from the rotational axis of the rotor, and it is thus possible to avoid interference between the reel body and the rod attachment portion. It is thus possible to prevent the size of the entire reel from becoming large.

In a spinning reel according to yet another aspect of the present invention, the bail swings together with the first and second bail support members and can adopt a line release state and a line winding state. Further, the first and second arm portions are displaced, with respect to the rotational axis of the rotor, to the side on which the bail is positioned in the line release state, and it is thus possible to suppress imbalance caused by the bail, by means of this displacement.

In a spinning reel according to yet another aspect of the present invention, the tips of the first and second arm portions are positioned on the side on which the bail is positioned in the line release state, and it is thus possible to suppress imbalance caused by the bail, and furthermore the bases of the two arm portions are positioned on the side on which the bail is positioned in the line winding state, and it is possible to set the overall center of gravity of the base portions and the bail on the reel body side (rear), and it is possible to suppress imbalance simply, by providing a balancer on the opposite side.

In a spinning reel according to yet another aspect of the present invention, a balance means is provided on that arm portion side, from among the first and second arm portions, whose center of gravity is positioned further forwards, and on the reel body side of the bail support member. With the overall center of gravity including the balance means on the arm portion side whose center of gravity is positioned further forward is set on the reel body side (rear), and it is simple to suppress imbalance by providing a balancer on the opposite side.

In a spinning reel according to yet another aspect of the present invention, the abovementioned means consists of a cover which is fitted to the outside of the arm portion. Since this cover is required to cover members inside the arm portion, it is possible to suppress imbalance by means of a simple procedure without providing a special balance.

In a spinning reel according to yet another aspect of the present invention, the rear end of the second bail support member and the second arm portion are connected smoothly, and thus catching of the fishing line is reduced.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
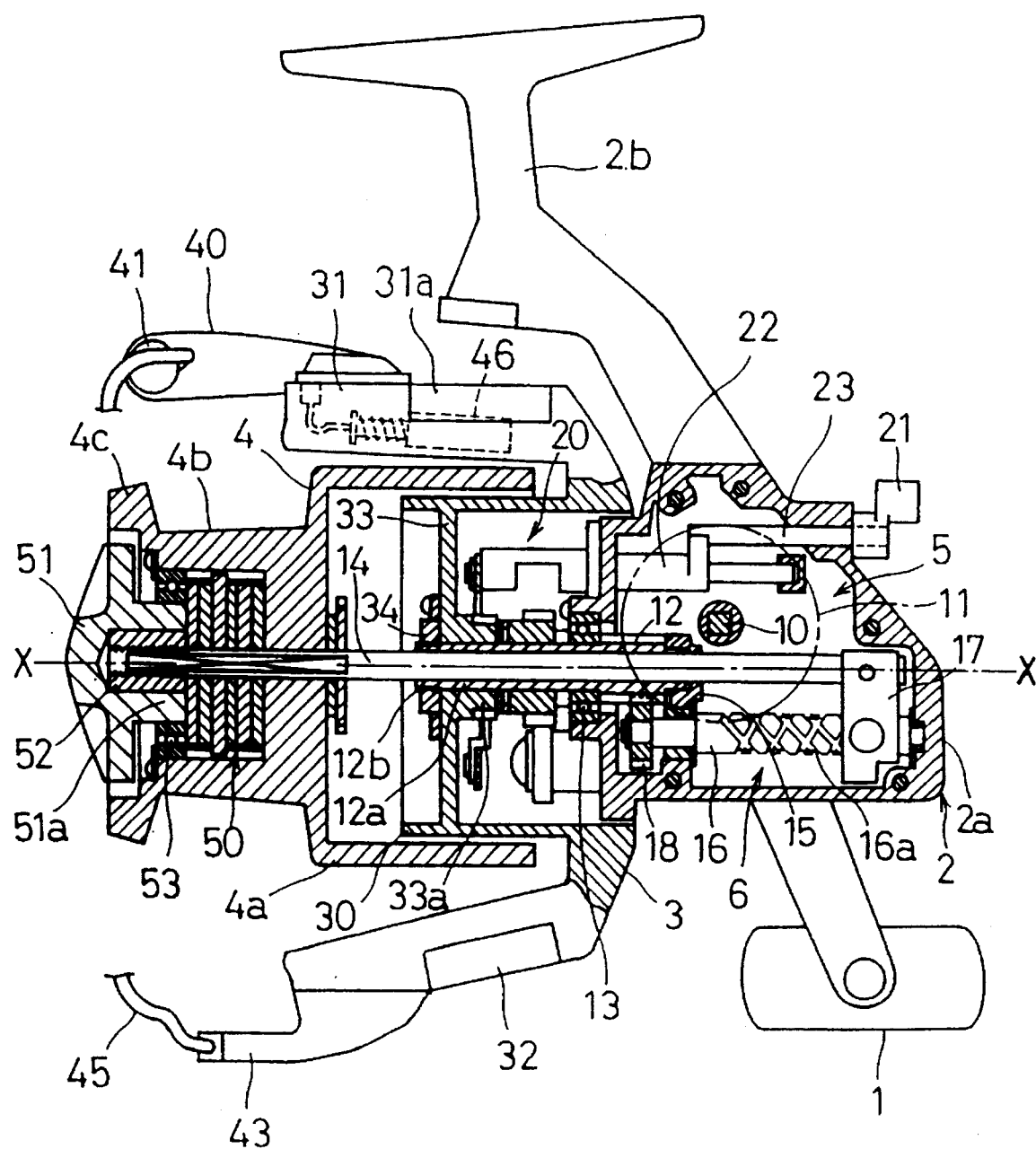
FIG. 1 is a fragmentary, part section, part elevation side view of a spinning reel according to an embodiment of the present invention.

The spinning reel according to one embodiment of the present invention, shown in FIG. 1, is provided with a reel body 2 which is provided with a handle 1, a rotor 3 which is supported with freedom to rotate at the front of the reel body 2, and a spool 4 which is located at the front of the rotor 3 and on which fishing line is wound.

The reel body 2 has a body 2a, and an attachment 2b for attaching the spinning reel to a fishing rod is formed at the top. A rotor drive mechanism 5 for rotating the rotor 3, and a level wind mechanism 6 for winding fishing line uniformly onto the spool 4 by moving the spool 4 backwards and forwards along a rotational axis X, are provided inside the body 2a.

The rotor drive mechanism 5 has a master gear 11 which rotates together with a spindle 10 to which the handle 1 is secured, and a pinion gear 12 which engages with the master gear 11. The pinion gear 12 is formed in a cylindrical shape, and its front 12a passes through the center of the rotor 3 and extends on the spool 4 side. The rear end of the pinion gear 12 is supported with freedom to rotate in a bearing 15 which is formed integrally with the body 2a of the reel body 2, and the front 12a is supported in a ball bearing 13 which is supported in the body 2a. A spool spindle 14 is provided passing through the center of the pinion gear 12 with freedom to move backwards and forwards along the rotational axis X. As shown in an enlargement in FIG. 2, a gap A is formed between the inner diameter of the pinion gear 12 and the outer diameter of the spool spindle 14. Further, the inner diameter 12b at the tip of the front 12a of the pinion gear 12 has a smaller diameter than other parts, and is a support for the spool spindle 14.

Figure 2:
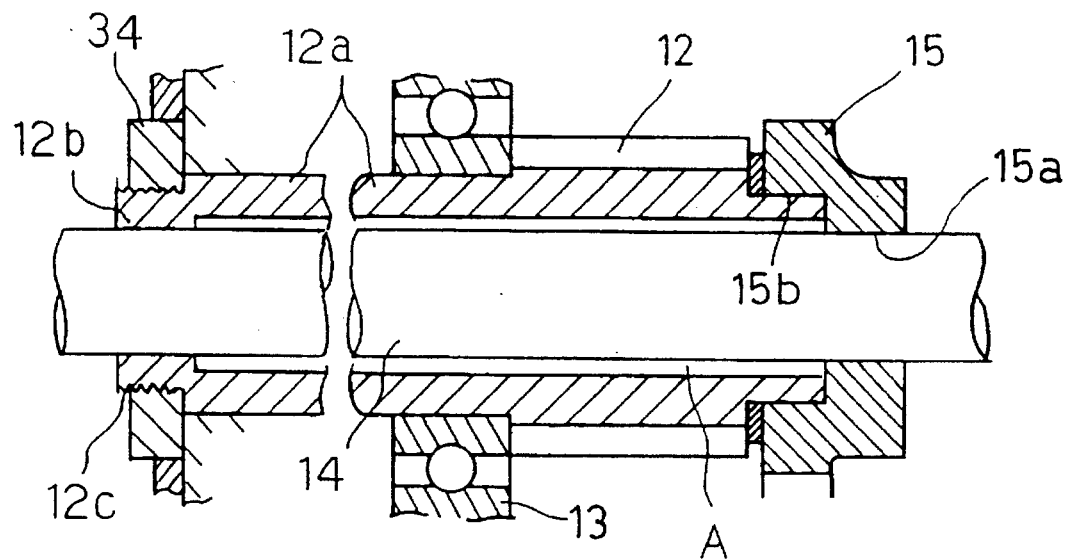
FIG. 2 is a fragmentary, enlargement of a portion of FIG. 1, showing a pinion and pinion support of the spinning reel.

As shown in an enlargement in FIG. 2, a first support 15a which supports the spool spindle 14, and a second support 15b which supports the pinion gear 12 are formed concentrically in the bearing 15. With such a construction of the bearing 15, the pinion gear 12 is reliably supported in the second support 15b, and the spool spindle 14 is also supported reliably in the first support 15a of the bearing 15. It is thus possible to avoid contact between the inner circumference of the pinion gear 12 and the outer circumference of the support spindle 14 in conjunction with the abovementioned gap A, and thus resistance due to friction is reduced.

With reference to FIG. 1, the level wind drive mechanism 6 has a helical grooved spindle 16 which is located below the spool spindle 14, a slider 17 which moves backwards and forwards along the helical grooved spindle 16, and a gear 18 which is secured to the tip of the helical grooved spindle 16. The helical grooved spindle 16 is located parallel to the spool spindle 14 and is supported with freedom to rotate in the body 2a. Further, a helical groove 16a is formed in the outer circumference of the helical grooved spindle 16. Further, the slider 17 is engaged with the helical groove 16a, and the rear end of the spool spindle 14 is secured to the top end of the slider 17. Further, the gear 18 is engaged with the pinion gear 12. By means of such a construction, the helical grooved spindle 16 is rotated by means of the pinion gear 12, the slider 17 moves backwards and forwards, and the spool spindle 14 and the spool 4 are moved backwards and forwards.

Figure 3:
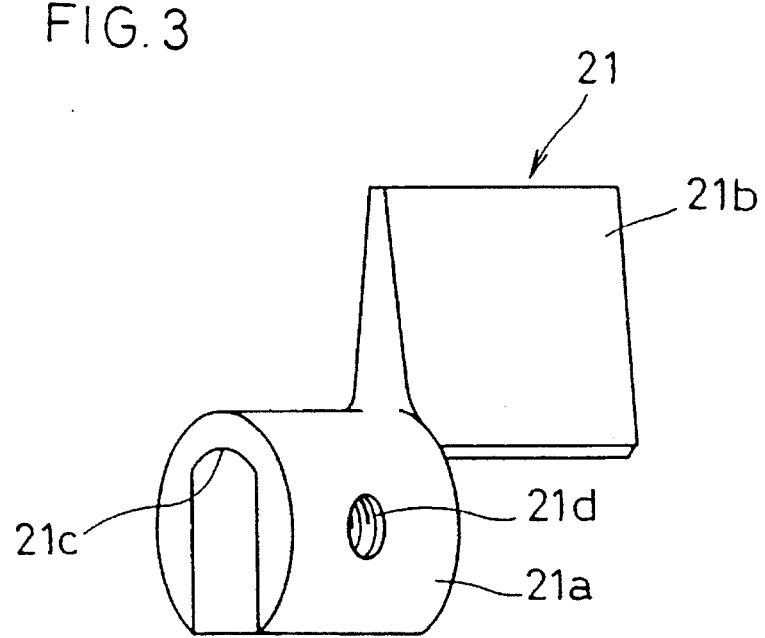
FIG. 3 is an oblique view of an operating lever shown removed from the spinning reel depicted in FIG. 1.

Further, an operating lever 21 for operating a ratchet mechanism 20 which is provided at the front of the reel body 2 is provided at the rear of the body 2a. The ratchet mechanism 20 and the operating lever 21 are connected via a first rotating spindle 22 and a second rotating spindle 23. As shown in FIG. 3, the operating lever 21 comprises a connecting portion 21a to which the rear end of the second rotating spindle 23 is connected, and an operating portion 21b which comes into contact with the finger of the operator. A slot 21c into which the rear end of the second rotating spindle 23 is inserted is formed in the connecting portion 21a, and a screw hole 21d into which is inserted a screw for securing the second rotating spindle 23 which has been inserted into the connecting portion 21a is formed in the side. One side of the slot 21c in the operating lever 21 is open, and thus during assembly the operating lever 21 can be attached as the final process, and thus the attachment operation is simplified.

Furthermore, the ratchet mechanism 20 is switched over between an operational state and a non-operational state by means of the operating lever 21. In the operational state, the handle 1 is prevented from rotating in the direction which lets line out. On the other hand, in the non-operational state, the handle 1 is permitted to rotate in both the direction which winds line in and the direction which lets line out.

Figure 5:
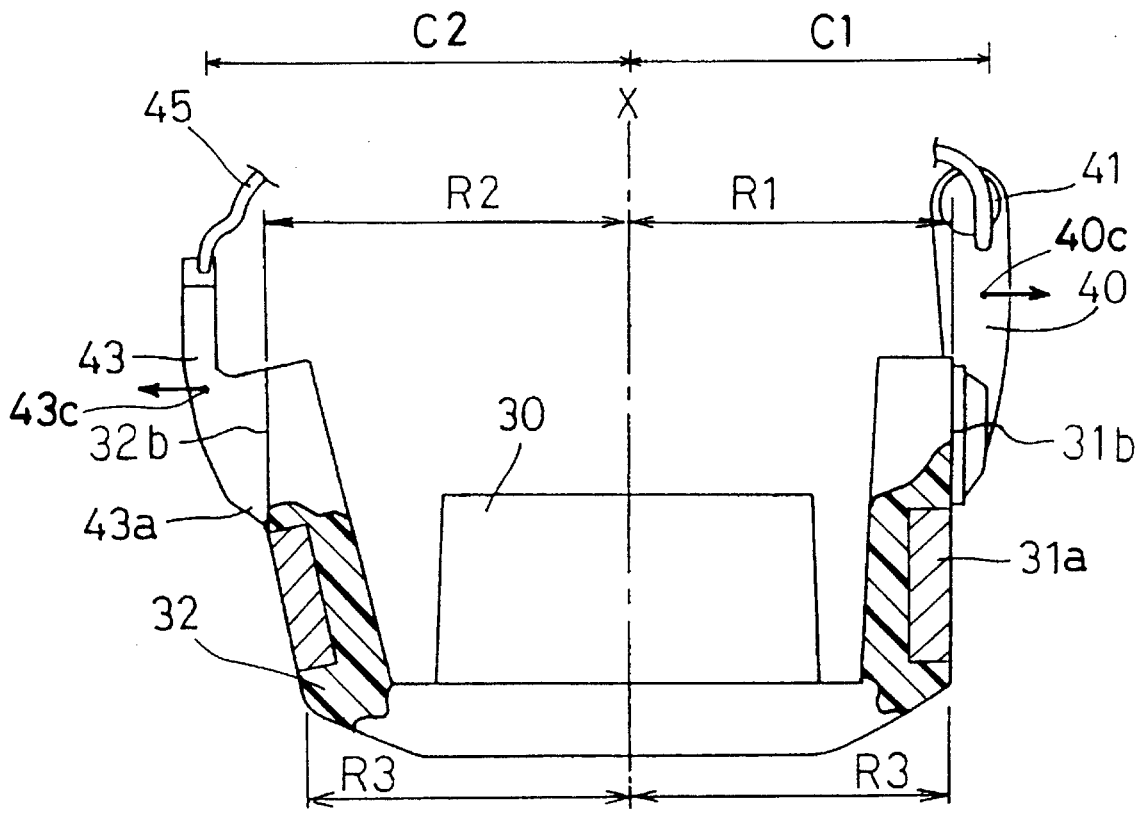
FIG. 5 is a fragmentary side elevation of a rotor shown removed from the spinning reel depicted in FIG. 1.

With reference again to FIGS. 1 and to FIG. 5, the rotor 3 is formed from any of a variety of materials, for instance resin or is formed from die cast aluminum, and it has a cylindrical portion 30, and a first arm portion 31 and a second arm portion 32 which are provided facing each other on the sides of the cylindrical portion 30. The cylindrical portion 30 and the two arm portions 31 and 32 are formed integrally. A front wall 33 (FIG. 1) is formed at the front of the cylindrical portion 30, and a boss 33a is formed in the center of the front wall 33. A through-hole is formed in the center of the boss 33a, and the front 12a of the pinion gear 12 and the spool spindle 14 pass through the through-hole. Further, a screw portion 12c is formed at the tip of the pinion gear 12 which extends through the front wall 33, and a nut 34 is screwed onto the screw portion 12c.

Figure 4:
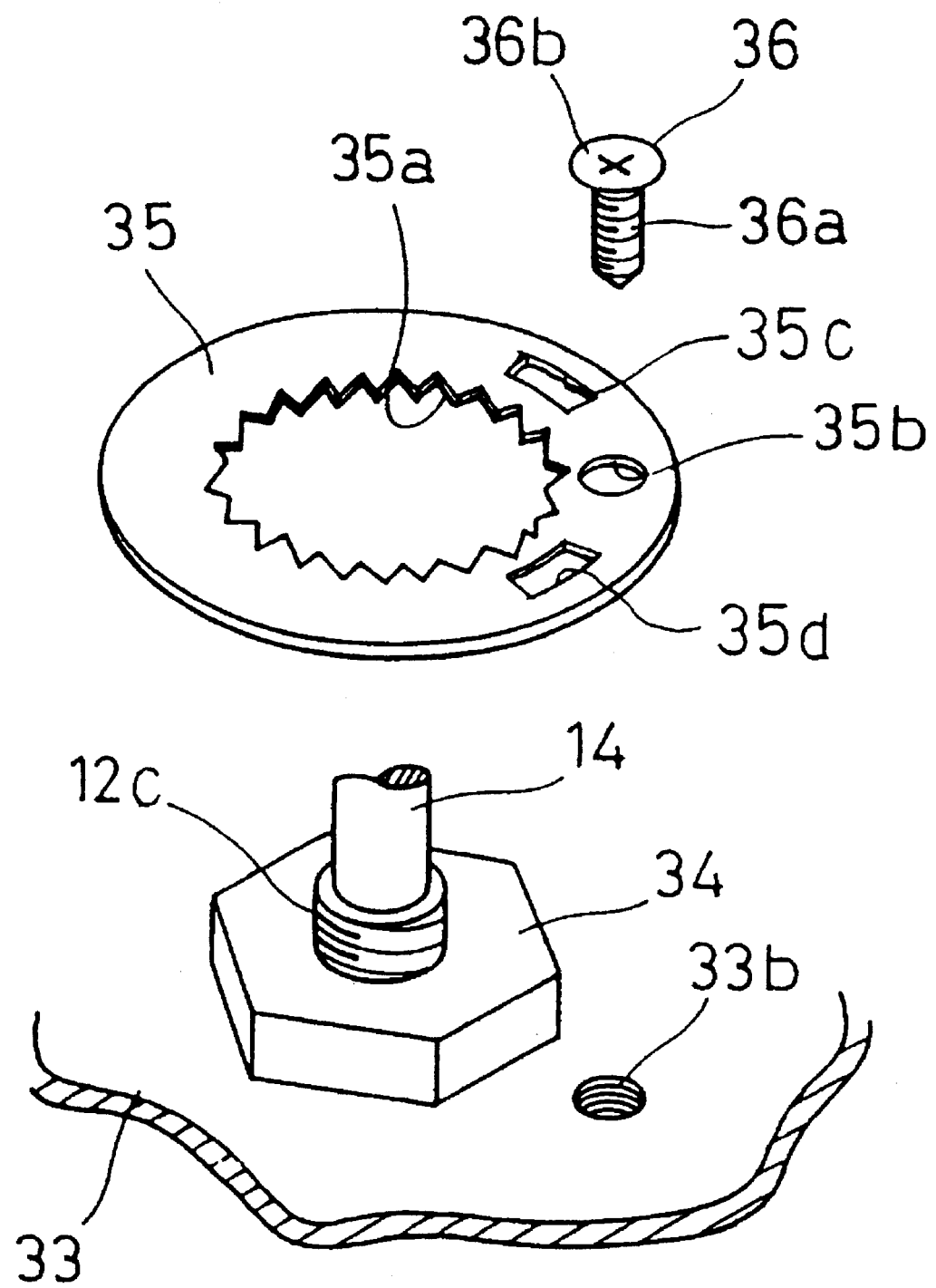
FIG. 4 is a fragmentary exploded oblique view of a portion of the spinning reel depicted in FIG. 1, showing means for securing the pinion.

Details of the components of the nut 34 are shown in an exploded view in FIG. 4. As shown in this figure, on the circumference of nut 34 a retainer 35 comprising an annular plate member is secured to the front wall 33 by means of a screw 36. A screw hole 33b into which the screw 36 is secured is formed in the front wall 33. A locking hole 35a into which the corners of the nut 34 can latch is formed in the center of the retainer 35. Further, a hole 35b through which the screw 36 passes, and arc-shaped slots 35c and 35d are formed in the circumference of the retainer 35. With such a nut securing construction, the screw 36 is secured, and thus this causes imbalance to occur during rotation. However, the screw portion 36a of the screw 36 is canceled out by the screw hole 33b, and the weight of the head 36b of the screw 36 is canceled out by the slots 35c and 35d in the retainer 35, and thus imbalance due to the screw 36 during rotation is suppressed.

Referring again to FIGS. 5 and 6, a first bail support member 40 is attached to the periphery of the tip (front) of the first arm portion 31 with freedom to pivot about a pivot pin 31P, which extends through the first bail support member 40 and the end of the first arm portion 31. A line roller 41 for guiding fishing line onto the spool 4 is rotatably fitted to the tip of the first bail support member 40. As shown in FIG. 1 and FIG. 5, the second arm portion 32 is inclined such that it becomes further away from the rotational axis X of the rotor 3 as one moves from the base to the tip. Further, a second bail support member 43 is fitted to the periphery of the tip thereof with freedom to pivot with respect to a seat face 32b, for instance, about a pin (not shown), but similar to the pin 31P described above. Here, the second arm portion 32 is inclined such that its tip is further away from the rotational axis X and thus the distance R2 from the rotational axis X to the second bail support member attachment seat face 32b of the second arm portion 32 is longer than the distance R1 from the rotational axis X to the first bail support member attachment seat face 31b of the first arm portion 31. Therefore the distance C2 from the rotational axis X to the center of gravity 43C of the second bail support member 43 is longer than the distance C1 from the rotational axis X to the center of gravity 40C of the first bail support member 40 including the line roller 41. On the other hand, the distances from the rotational axis X to the respective bases of the first arm portion 31 and the second arm portion 32 are both an equal distance R3. The outer surface of the rear end 43a of the second bail support member 43 is only connected to the outer surface of the second arm portion 32 and a fishline (not shown) wound by rotation of the rotor 3 generally is urged into engagement with the line roller 41 and is generally not caught by the rear end of the second bail support member 43.

A bail 45 is provided between the line roller 41, which is provided at the tip of the first bail support member 40, and the second bail support member 43, as shown in FIG. 1. A space is formed inside the first arm portion 31, and a toggle mechanism 46 is located in this space. By means of this toggle mechanism 46, the first bail support member 40, the second bail support member 43 and the bail 45 are arranged such that they can be pivoted over and maintained in 2 positions, namely a line winding state and a line release state.

The internal space in which the toggle mechanism 46 is located is covered by a cover 31a which is attached to the periphery of the first arm portion 31. The cover 31a may be, for instance formed from die cast zinc with a larger relative density than the resin or aluminum from which the rotor 3 is formed, and as is clear from FIG. 6, its center of gravity is on the side of the rotational axis X on which the bail 45 is positioned when in the line winding state, and is on the reel body side (rear) of the first bail support member 40. Such a cover 31a functions as a balancer, and the overall center of gravity of members fitted to the first arm portion 31 is displaced to the reel body side in comparison with the case in which the cover 31a is not provided.

Figure 6:
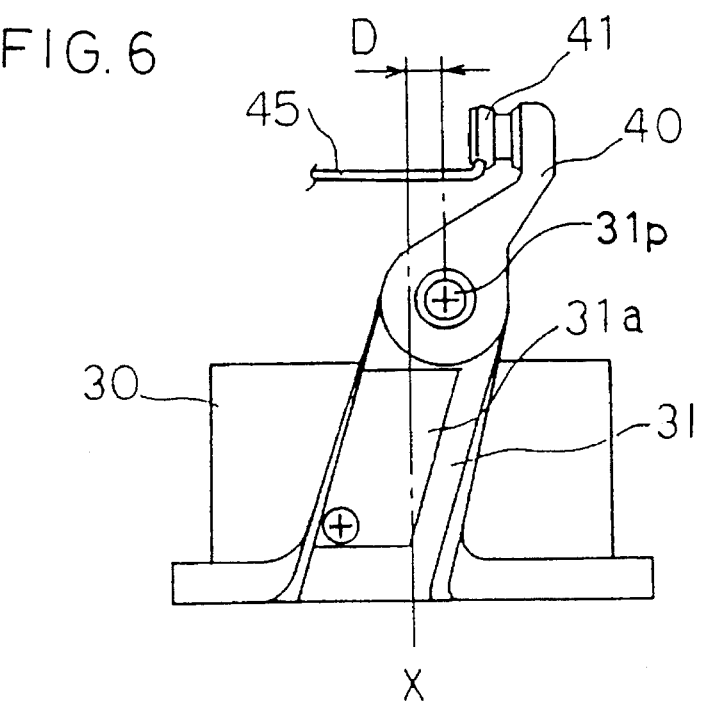
FIG. 6 is a side elevation of the rotor depicted in FIG. 5.

Further, as shown in FIG. 6, the tips of the first arm portion 31 and the second arm portion 32 are positioned on the side of the rotational axis X on which the bail 45 is positioned when in the line release state, and the bases thereof are positioned on the reverse side on which the bail 45 is positioned when in the line winding state. Further, the sliding center of the second bail support member 43 is displaced by D from the rotational axis X on the line release state side.

Figure 7:
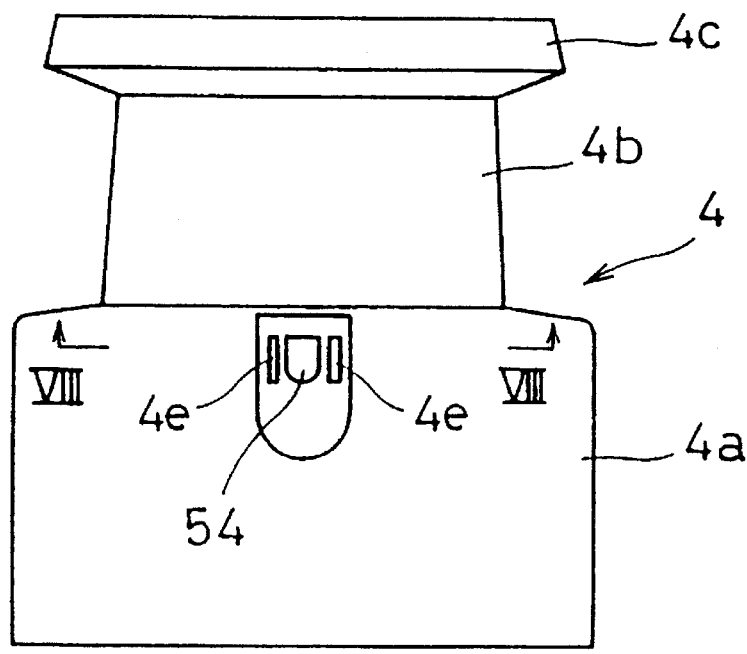
FIG. 7 is a side elevation of a spool shown removed from the spinning reel depicted in FIG. 1.

The spool 4 is positioned between the first arm portion 31 and the second arm portion 32 of the rotor 3, and is fitted to the tip of the spool spindle 14 via a drag device 50 (FIG. 1). As shown in FIG. 7, the spool 4 has a cylindrical skirt portion 4a which is formed at the rear end, a line winding barrel portion 4b which is disposed to the front of the skirt portion 4a, and a flange portion 4c which is formed at the tip of the line winding barrel portion 4b. The cylindrical portion 30 of the rotor 3 is inserted into the skirt portion 4a. A space is also formed inside the line winding barrel portion 4b, and a multi-plate frictional drag device 50 is provided in this space. An adjustment knob 51 for adjusting the drag force is provided at the front of the drag device 50. A cylindrical press portion 51a is formed at the rear end of the adjustment knob 51, and a nut member 52 is embedded inside the cylindrical portion 51a. The nut member 52 screws onto a screw portion formed at the tip of the spool spindle 14. Further, a ball bearing 53 is located between the periphery of the cylindrical portion 51a of the adjustment knob 51 and the inside of the line winding barrel 4b of the spool 4.

With such a construction, the pressing force on the plates constituting the drag device 50 can be varied by adjusting the tightening of the adjustment 51, and the drag force can be adjusted. Further, since the adjustment knob 51 and the spool are supported by the ball bearing 53, it is possible to prevent the spool 4 from shaking even when the drag force is slackened.

Figure 8:
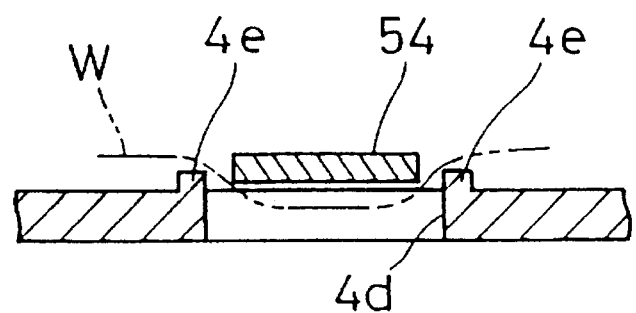
FIG. 8 is a fragmentary cross section of the spool, taken along the line VIII—VIII in FIG. 7.

Further, as shown in FIG. 7, a line fixing guide 54 is provided on the outer surface of the skirt portion 4a of the spool 4. A portion of the line fixing guide 54 extends into hole 4d (refer to FIG. 8) formed in the spool 4 and is fixed by a screw (not shown) to the inside of the skirt portion 4a. Projections 4e which project outward are formed at the edges of the hole 4d on both sides of the line fixing guide 54. As shown in FIG. 8, with such a construction it is possible a line W reliably by means of the projections 4e and the line fixing guide 54 when the line W is latched into the line fixing guide 54 and to prevent the line escaping from the line fixing guide 54.

A description of the action of the present embodiment will now be given paying attention mainly to line winding.

During line winding, the bail 45 is pivoted over to the line winding state side. If the handle 1 is rotated in this state, the rotational force is transmitted via the handle spindle 10 and the master gear 11 to the pinion gear 12. The rotational force transmitted to the pinion gear 12 is transmitted to the rotor 3 via the front portion 12a of the pinion gear.

On the other hand, the helical grooved spindle 16 is rotated by the gear 18 which is engaged in the pinion gear 12, and the slider 17 which is engaged in the helical groove 16a of the helical grooved spindle 16 moves backwards and forwards. Thus the spool spindle 14 and the spool 4 shuttle backwards and forwards along the rotational axis X and the line W which is guided by the bail 45 and the line roller 41 onto the spool 4 is wound uniformly backwards and forwards onto the line winding barrel portion 4b.

Here, if the rotor 3 is rotated then the bail 45 similarly rotates. During line winding, the bail 45 is positioned on one side (the line winding state side), and thus if, for example, the arm portions 31 and 32 were located such that the central axis of swinging of the bail support members 40 and 43 passes through the rotational axis X, then imbalance resulting from the bail 45 would occur during rotation. Thus in the present embodiment, as outlined above, the central axis of swinging is displaced by the distance D (FIG. 6) from the rotational axis X on the line release state side. Imbalance due to the bail 45 is eliminated by this displacement. Further, the bases of the two arm portions 31 and 32 are located on the side with the bail in the line winding state, and the cover 31a of the first arm portion 31 is preferably formed from die cast zinc. Thus the overall center of gravity of the bail 45, the line roller 40 and the cover 31a is located on the reel body side (rear). Thus balancers are provided on opposite sides, and the suppression of imbalance during rotation is simple.

Further, the first bail support member 40 including the line roller 41 is provided on the first arm portion 31, and thus in order to eliminate imbalance resulting from the weights thereof during rotation, a balance means such as a weight is also required on the facing second arm portion 32 side. In the present embodiment, the second bail support member 40 is positioned further from the rotational axis X than the first bail support member 43. Thus even though the weight of the second bail support member 43 is small, its centrifugal force is large, and it is possible to reduce imbalance during rotation resulting from the line roller 41, for example, due to the small second bail support member 43. Thus for the same reason it is not necessary to project the second bail support member 43 outward greatly, and it is thus possible to reduce the risk of catching of the line at the rear end of the second bail support member 43.

Moreover, the base of the second arm portion 32 is not displaced outward, and thus it is not necessary to separate the attachment portion 2b of the body 2a very far from the periphery of the rotor 3. It is thus possible to keep the height dimension down.

[Alternative embodiments]

(a) In the abovementioned embodiment, the second arm portion 32 was provided inclined such that it became further away from the rotational axis X as one moved from the base to the tip, but the form of the second arm portion is not limited to the abovementioned embodiment.

Figure 9:
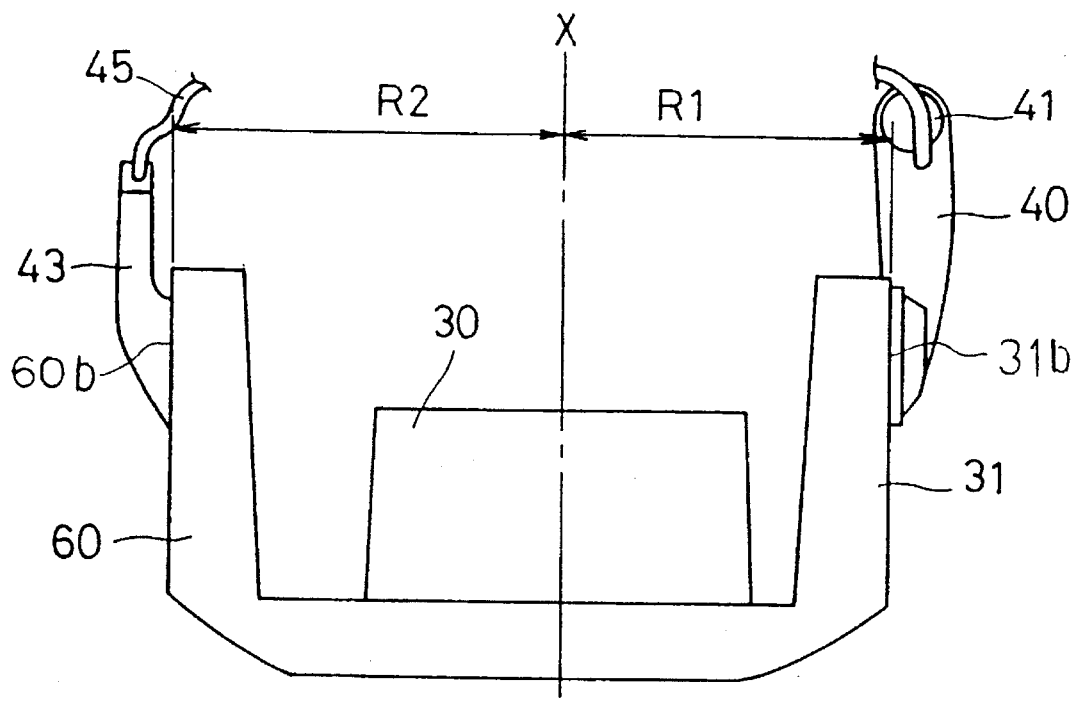
FIG. 9 is a side elevation similar to FIG. 5 showing a rotor according to another embodiment of the present invention.

In the embodiment shown m FIG. 9, for example, the second arm portion 60 is formed approximately parallel to the rotational axis X, and not only the tip but also the base are formed in a position which is further away from the rotational axis X and the base of the first arm portion 31.

In this case also, in the same way as mentioned above, the second bail support member attachment seat face 60b of the second arm portion 60 is further away from the rotational axis X than the first bail support member attachment seat face 31b of the first arm portion 31. Therefore, the center of gravity of the second bail support member 43 is further way from the rotational axis X than the center of gravity of the first bail support member 40 including the line roller 41. Therefore, the same advantages as in the abovementioned embodiment can be obtained.

Figure 10:
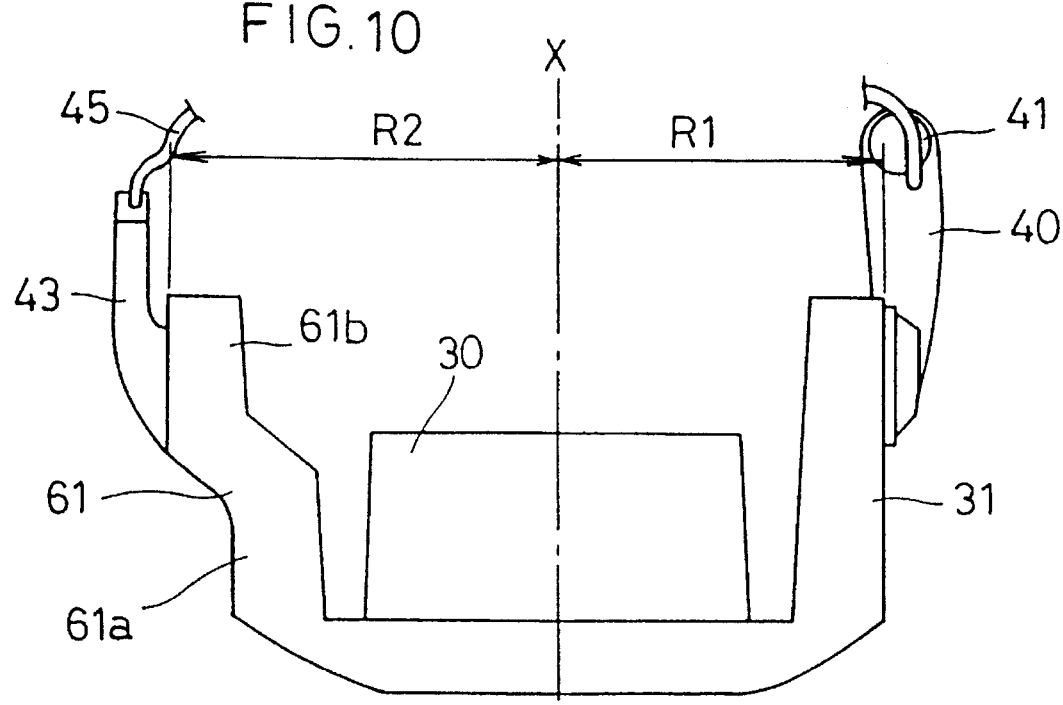
FIG. 10 is a side elevation similar to FIGS. 5 and 9, showing a rotor according to yet another embodiment of the present invention.

(b) Yet another embodiment of the second arm portion as shown in FIG. 10. In this embodiment the second arm portion 61 is formed with a stepped shape, and the portion from the center to the rear is formed approximately symmetrically, about the rotational axis X, with the part of the first arm portion 31 which faces it across the rotational axis X. On the other hand, from the center to the front it is located such that it is further away from the rotational axis X than the tip of the first arm portion 31.

Even with such an embodiment, the second bail support member attachment seat face of the second arm portion 61 is further away from the rotational axis X than the first bail support member attachment seat face of the first arm portion 31, and therefore the center of gravity of the second bail support member 43 is further from the rotational axis X than the center of gravity of the first bail support member 40 including the line roller 41. Thus the same advantages as in the previous embodiment can be obtained.

Figure 11:
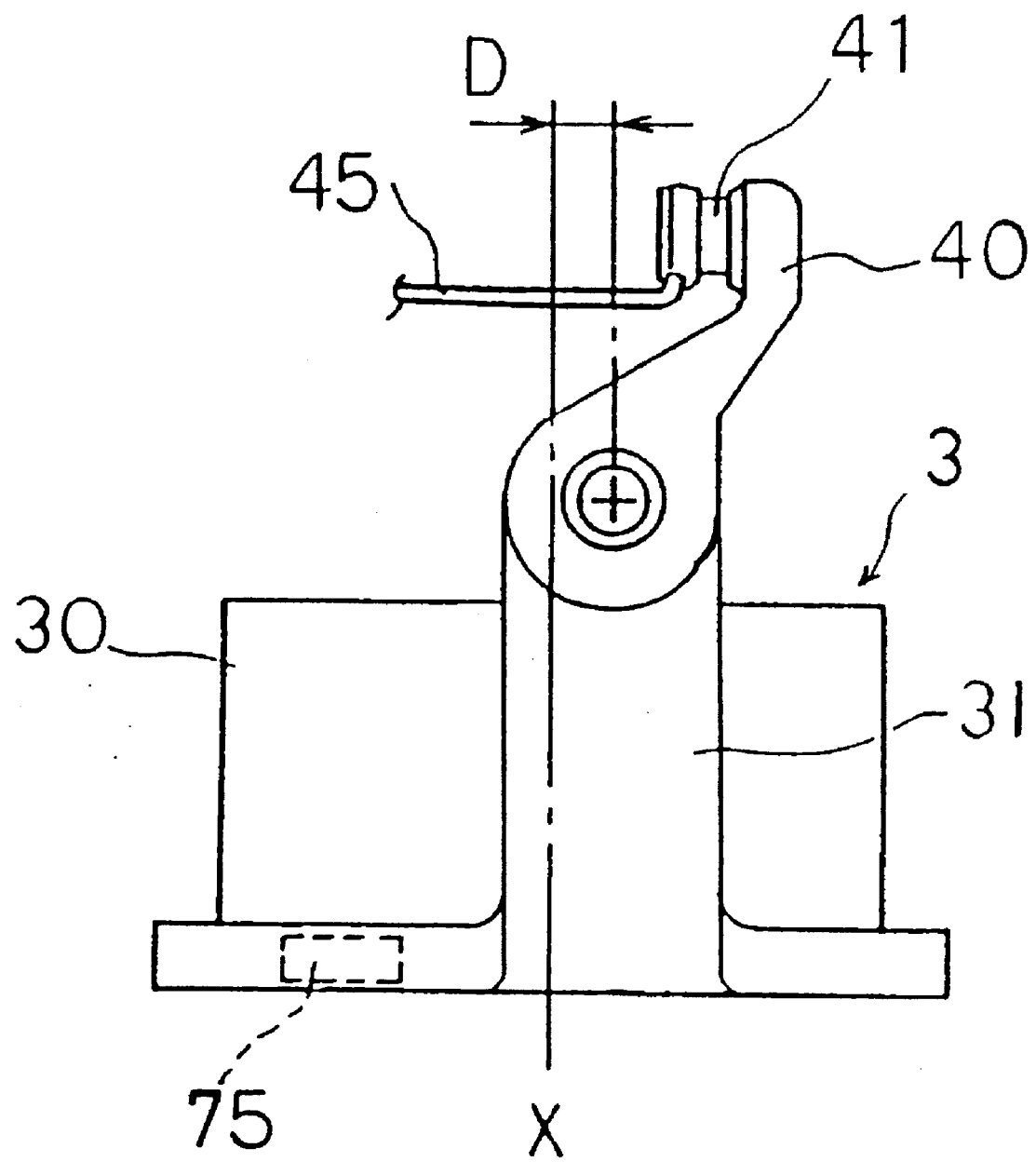
FIG. 11 is a fragmentary side elevation similar to FIG. 6, showing a rotor according to yet another embodiment of the present invention.

(c) In the abovementioned embodiment, both arm portions 31 and 32 are inclined, but as shown in FIG. 11, both arm portions 31 and 32 may be formed parallel with the rotational axis X. In this case, it is preferable to locate a balancer 75 at the end of the rotor 3 on the reel body side. The balancer 75 is located to the side of the rotational axis X on which is located the first arm portion 31 on which the line roller is provided, and on the side on which the bail 45 is located during the line winding state. By means of the balance 75, the overall center of gravity of the first bail support member 40, the line roller 41 and the balancer 75 is displaced to the reel body side in comparison with the case in which the balance 75 is not provided, and location of balancers on opposite sides is simple.

(d) It is also possible to fit a balancer or weight member to the first arm portion 31 instead of the cover 31a.

Figure 12:
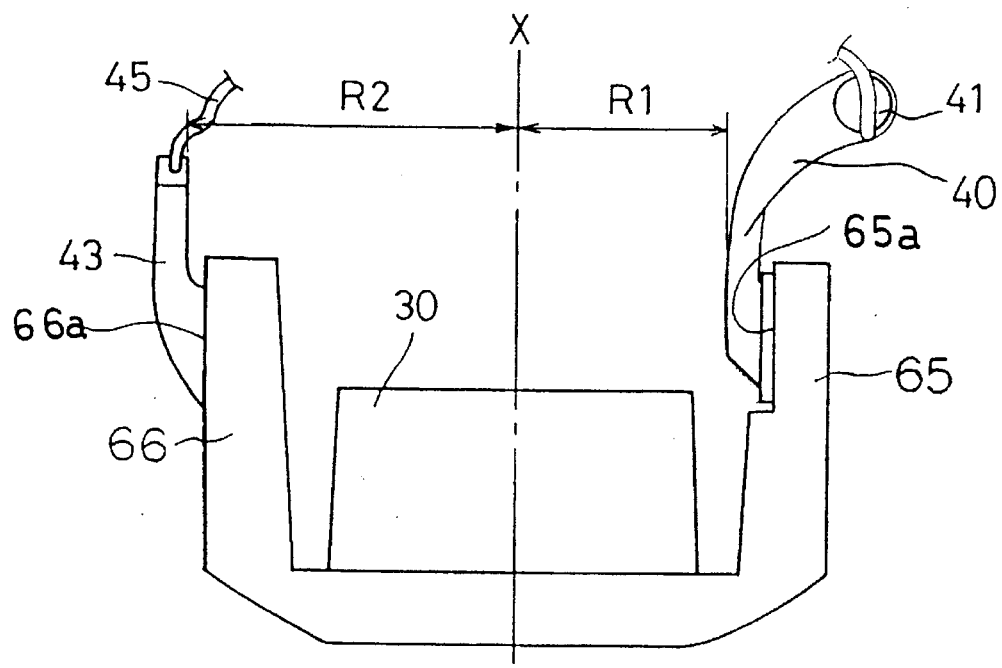
FIG. 12 is a side elevation of a rotor according to yet another embodiment of the present invention.

(e) Yet another embodiment is shown in FIG. 12.

In this embodiment an attachment seat face is formed on the inside (rotational axis X side) of the tip of the first arm portion 65, and the first bail support member 40 is fitted to the attachment one seat face 65a with freedom to pivot. However, the second arm portion 66 is located symmetrically to the first arm portion 65 with respect to the rotational axis X. Further, an attachment seat face 66a is formed on the outside of the tip of the second arm portion 66, and the second bail support member 43 is fitted to this attachment seat face with freedom to pivot.

Here, the distance R2 from the rotational axis X to the side face of the second bail support member 43 on the rotational axis side is longer than the distance R1 from the rotational axis X to the side face of the first bail support 40 on the rotational axis side. Thus the center of gravity of the second bail support member 43 is further from the rotational axis X than the center of gravity of the first bail support member 40 including the line roller 41.

The advantages of the abovementioned embodiment can also be obtained in this case.

Figure 13:
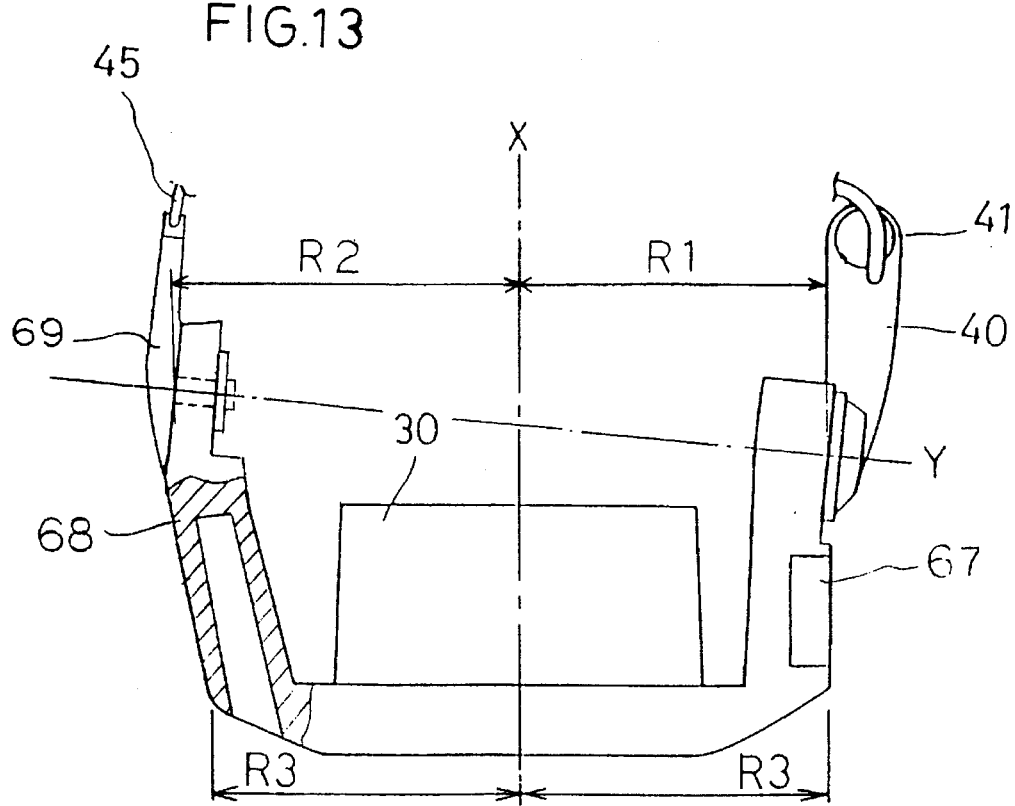
FIG. 13 is a part section, part side elevation of a rotor according to yet another embodiment of the present invention.

(f) Yet another embodiment is shown in FIG. 13.

In this embodiment the first bail support member 40 is fitted to the tip of the first arm portion 67 with freedom to swing, and further a second bail support member 69 is fitted to the tip of the second arm portion 68 with freedom to swing. Further, the center of swing of the second bail support member 69 is located further forward than the center of swing of the first bail support member 40, and the axis of swing Y is not orthogonal to the rotational axis X. Furthermore, a hollow of a given depth is provided directed from the base towards the tip in the second arm portion 68.

In such an embodiment, the overall center of gravity including all of the components on the second arm portion side is located further forward, and imbalance resulting from the first bail support member 40 including the line roller 41 is more readily suppressed.

[Advantages of the invention]

As outlined above, in a spinning reel according to the present invention the tip on the second arm portion side is further away from the rotational axis than the facing tip of the first arm portion on which the line guiding portion is provided. It is thus possible to suppress imbalance during rotation without providing a balancer on the second arm portion side, or without altering the small size of the cam on the second arm portion side.

In the spinning reel according to another aspect of the present invention, the second arm portion is inclined such that it becomes further away from the rotational axis of the rotor as one moves towards the tip, and it is thus possible to position the center of gravity of the second arm portion side further forward, and it can approach the position of the overall center of gravity of the first arm portion side.

In a spinning reel according to another aspect of the present invention, the bases of the first and second arm portions are positioned approximately equidistant from the rotational axis of the rotor, and thus the size of the reel body can be reduced since it is possible for the reel attachment portion to be closer to the rotor.

In a spinning reel according to yet another aspect of the present invention, the first and second arm portions are displaced, with respect to the rotational axis of the rotor, to the side on which the bail is positioned in the line release state, and it is thus possible to suppress imbalance resulting from the bail, due to this displacement.

In a spinning reel according to yet another aspect of the present invention, the bases of the first and second arm portions are positioned on the side in which the bail is positioned in the line winding state, and thus the overall center of gravity of the bases and the bail can be set on the reel body side (rear), and it is simple to provide balances on opposite sides in order to suppress imbalance.

In a spinning reel according to yet another aspect of the present invention, the overall center of gravity of members on the arm portion side, the center of gravity of which is positioned further forward, is positioned on the reel body side, by means of a balance means, and it is thus simple to provide balancers on opposite sides in order to suppress imbalance.

In a spinning reel according to yet another aspect of the present invention, a balance means consists of a cover which is fitted to the outside of the arm portion, and it is thus possible to suppress imbalance using a simple construction without providing a special balancer.

In a spinning reel according to yet another aspect of the present invention, the second bail support member rear end and the second arm portion are connected smoothly, and thus catching of the fishing line is reduced.

In a spinning reel according to yet another aspect of the present invention, the center of swing of the second bail support member is positioned further forward than the center of swing of the first bail support member and it is thus simple to suppress imbalance resulting from the first bail support member and the like.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A spinning reel for a fishing rod, the spinning reel comprising:

a reel body having a handle and means for fitting to a fishing rod, a rotor having a cylindrical portion which is supported for rotation about a rotational axis on a front side of said reel body, a first arm portion and a second arm portion which are formed integrally with said cylindrical portion and which are located facing each other at opposite sides of said cylindrical portion with said rotational axis between them wherein said rotor is rotatable in response to movement of said handle, a first bail support member which is fitted to said first arm portion for rotational movement with respect thereto, said first bail support member having a line guiding portion attached thereto, said first bail support member and said line guiding portion defining a first center of gravity, a second bail support member which is fitted to said second arm portion for rotational movement with respect thereto, said second bail support member defining a second center of gravity, a bail extending between said first bail support member and said second bail support member such that said bail, said first bail support member and said second bail support member rotate together with respect to said first and second arm portions, and a spool which is located between said first arm portion and second arm portion, wherein the distance from the rotational axis of said rotor to said second center of gravity of said second bail support member is longer than the distance from the rotational axis of said rotor to said first center of gravity of the first bail support member such that said second bail member distance from said rotational axis at least partially balances weight of said line guiding portion on said first bail member in response to rotational dynamic forces.

2. The spinning reel as in claim 1 wherein said first bail support member is attached to an attachment seat face formed on a side of said first arm portion and second bail support member is attached to an attachment seat face formed on a side of said second arm portion and the distance from the rotational axis of said rotor to said attachment seat face of said second bail support member is longer than the distance from the rotational axis of said rotor to said attachment seat face of said first bail support member.

3. The spinning reel as in claim 1 wherein said first bail support member is attached to the inside of said first arm portion and second bail support member is attached to the outside of said second arm portion, and the distance from the rotational axis of said rotor to the side face of said second bail support member on the rotational axis side is longer than the distance from the rotational axis of said rotor to the side face of said first bail support member on said rotational axis side.

4. A spinning reel for fitting to a fishing rod, the spinning reel comprising:

a reel body which has a handle and is adapted to be fitted to a fishing rod, a rotor which has a cylindrical portion which is supported for rotation about a rotational axis on a front side of said reel body, a first arm portion and a second arm portion which are formed integrally with said cylindrical portion facing each other at opposite sides of said cylindrical portion with said rotational axis between them, said first arm portion and said second arm portion each formed with an attachment seat face, a first bail support member which is fitted to a side of said first arm portion, said first bail support member having a line guiding portion attached thereto, a second bail support member fitted to a side of said second arm portion, a bail which is provided extending between said first bail support member and the second bail support member, and and a spool which is located between said first arm portion and second arm portion, wherein a distance from said rotational axis of said rotor to said attachment seat face of said second arm portion is longer than the distance from said rotational axis of said rotor to said attachment seat face of said first arm portion.

5. The spinning reel as in claim 4, wherein said second arm portion is inclined such that it is positioned further away from said rotational axis of said rotor as one moves towards a distal end thereof.

6. The spinning reel as in claim 4, wherein the bases of said first and second arm portions are positioned approximately equidistant from the rotational axis of said rotor.

7. The spinning reel as in claim 4, wherein said first bail support member and second bail support member are each fitted with freedom to pivot with respect to said first and second arm portions, said bail pivots together with said two bail support members and is positionable in a line release state and a line winding state, and wherein said first and second arm portions are offset, with respect to said rotational axis of said rotor, to a side of said rotational axis on which the bail is positioned when in the line release state.

8. The spinning reel as in claim 7, wherein said first and second arm portions are inclined to a side of said rotational axis on which said bail is positioned in the line release state, in the direction from a base end thereof to a distal end thereof, and said distal ends are positioned on the side of said axis of rotation on which said bail is positioned in the line release state.

9. The spinning reel as in claim 4, wherein bases of said first and second arm portions are positioned on a side of said rotational axis on which said bail is positioned in a line winding state.

10. The spinning reel as in claim 4, wherein there is further provided a means for balancing said rotor which is located on said rotor adjacent to one of said arm portions.

11. The spinning reel as in claim 10, wherein said means for balancing comprises a cover which is formed from a material whose specific density is greater than the specific density of the material from which said rotor is constructed.

12. The spinning reel as in claim 4, wherein the center of swing of said second bail support member is positioned further forward than the center of swing of said first bail support member where the forward direction is defined as the direction extending away from said cylindrical portion toward said bail, along said rotational axis.

* * * * *